US011764984B2

(12) United States Patent
Komeda

(10) Patent No.: US 11,764,984 B2
(45) Date of Patent: Sep. 19, 2023

(54) TELECONFERENCE METHOD AND TELECONFERENCE SYSTEM

(71) Applicant: SHARP KABUSHIKI KAISHA, Sakai (JP)

(72) Inventor: Asuka Komeda, Sakai (JP)

(73) Assignee: SHARP KABUSHIKI KAISHA, Sakai (JP)

( * ) Notice: Subject to any disclaimer, the term of this patent is extended or adjusted under 35 U.S.C. 154(b) by 0 days.

(21) Appl. No.: 17/851,544

(22) Filed: Jun. 28, 2022

(65) Prior Publication Data

US 2023/0035219 A1    Feb. 2, 2023

(30) Foreign Application Priority Data

Jul. 30, 2021   (JP) ................... 2021-125635

(51) Int. Cl.
*H04L 12/18* (2006.01)

(52) U.S. Cl.
CPC ...... *H04L 12/1822* (2013.01); *H04L 12/1831* (2013.01)

(58) Field of Classification Search
CPC ................ H04L 12/1822; H04L 12/1831
See application file for complete search history.

(56) References Cited

U.S. PATENT DOCUMENTS

| | | | | |
|---|---|---|---|---|
| 10,972,295 B1 * | 4/2021 | van Rensburg | ........ | H04N 7/152 |
| 2013/0227437 A1 * | 8/2013 | Brody | ................ | H04L 12/1822 |
| | | | | 715/757 |
| 2014/0111597 A1 * | 4/2014 | Anderson | ........... | H04L 65/1073 |
| | | | | 348/14.03 |
| 2017/0019636 A1 * | 1/2017 | Kitazawa | ................. | H04N 7/15 |
| 2022/0070066 A1 * | 3/2022 | Tokuchi | .................. | H04L 41/22 |
| 2022/0247975 A1 * | 8/2022 | Lanier | .................... | H04N 7/152 |
| 2023/0028265 A1 * | 1/2023 | Powell | .................... | G06F 3/165 |

FOREIGN PATENT DOCUMENTS

JP    2001-274912 A    10/2001

* cited by examiner

*Primary Examiner* — John A Follansbee
*Assistant Examiner* — Raqiul A Choudhury
(74) *Attorney, Agent, or Firm* — ScienBiziP, P.C.

(57) ABSTRACT

A method for teleconferencing is provided. The method acquires voices of at least three participants who attend a teleconference from each of individual conference terminals of the participants and generates voice data including volume information from the acquired voices. The method also acquires video of the participants during the teleconference from each individual conference terminal and generates video data. The method displays seating information indicating seatings associated with the participants in a virtual space for each of the conference terminals of the participants. The method determines a destination of the voice data of the participants for each of the conference terminals of the participants in accordance with the voice data and the video data of the participants as well as the seating information. The method transmits the voice data of the participants from the conference terminals of the participants to destinations determined for the voice data of the participants.

8 Claims, 4 Drawing Sheets

FIG. 3A
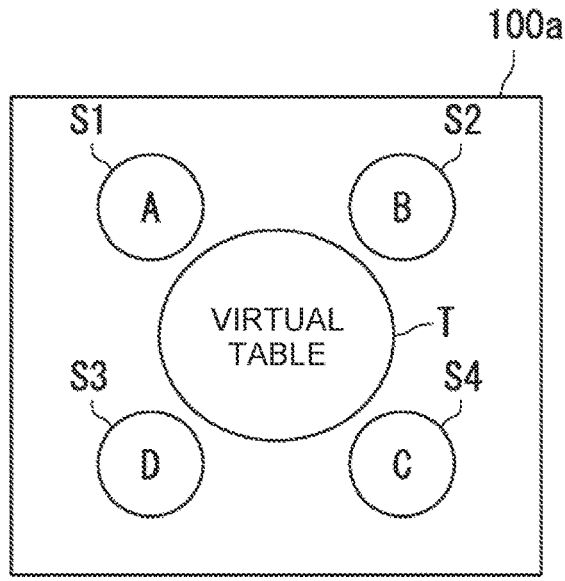
FIG. 3B
| PARTICIPANT | ON LEFT | ON RIGHT |
|---|---|---|
| A | CONFERENCE TERMINAL 10B | CONFERENCE TERMINAL 10D |
| B | CONFERENCE TERMINAL 10C | CONFERENCE TERMINAL 10A |
| C | CONFERENCE TERMINAL 10D | CONFERENCE TERMINAL 10B |
| D | CONFERENCE TERMINAL 10A | CONFERENCE TERMINAL 10C |
FIG. 4
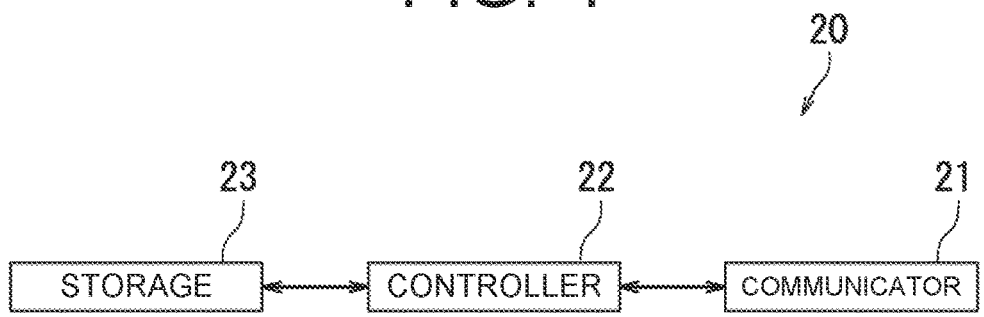

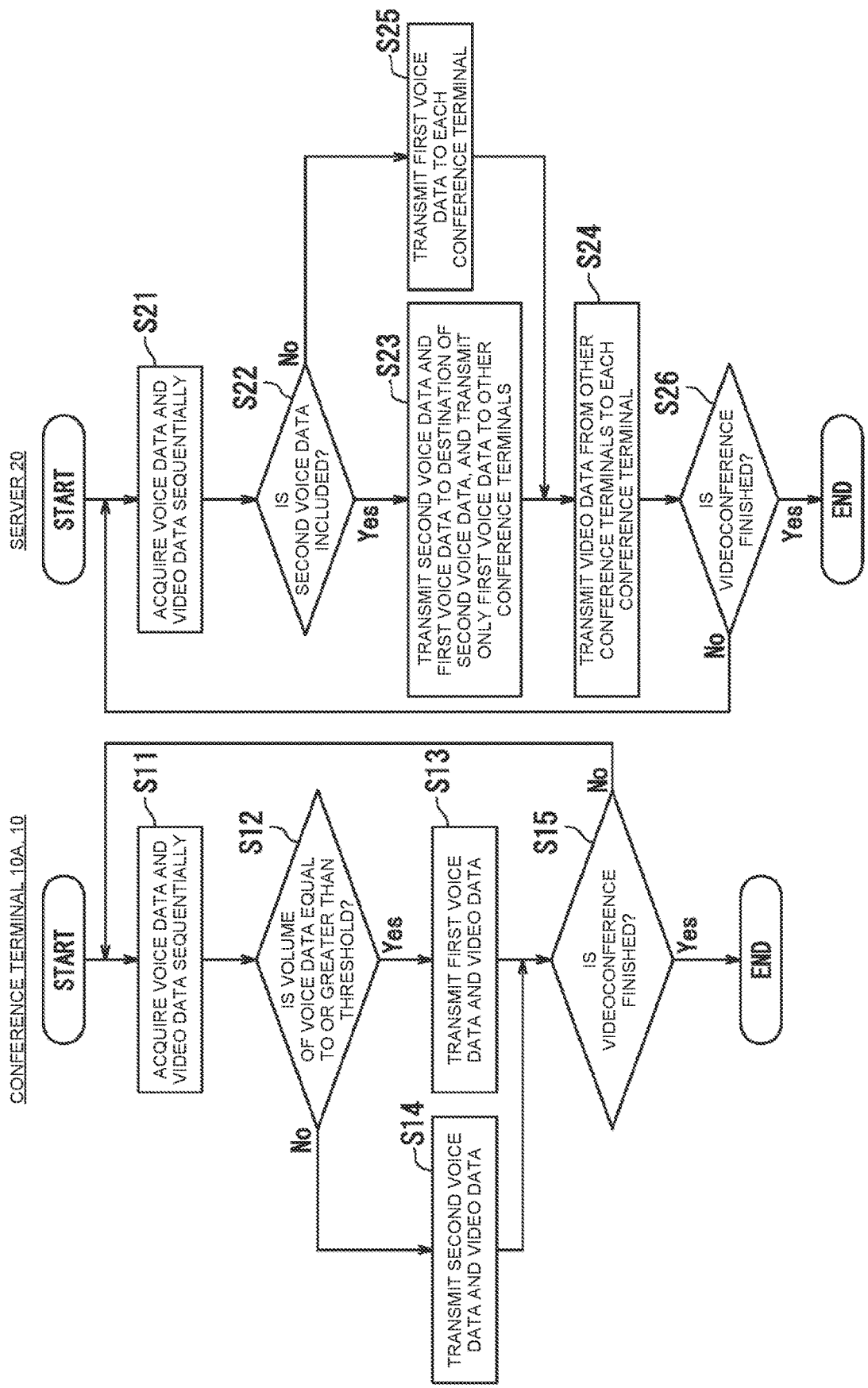

TELECONFERENCE METHOD AND TELECONFERENCE SYSTEM

INCORPORATION BY REFERENCE

The present application claims the benefit of priority under 35 U.S.C. 119 based on Japanese Patent Application No. 2021-125635 filed on Jul. 30, 2021, and the disclosure of which is incorporated herein by reference in its entirety.

BACKGROUND

The present disclosure relates to a teleconference method and a teleconference system.

In recent years, the use of videoconference systems via communication lines such as the Internet or leased lines has been increasing. For example, a conversation control method in which a plurality of (three or more) people in remote locations conduct a voice conference using a telephone line or other means has been disclosed. Such a conversation control method generates three-dimensional voice data for the participants of the conference in accordance with the locations, orientations, and the like of the participants in a virtual layout, so that each participant can easily understand the current situation like who is speaking to whom.

SUMMARY

A teleconference method according to the present disclosure includes a first generating, a second generating, displaying, determining, and transmitting. The first generating acquires voices of at least three participants who attend a teleconference from each of individual conference terminals of the participants and generates voice data including volume information from the acquired voices. The second generating acquires video of the participants during the teleconference from each of the conference terminals of the participants and generates video data. The displaying displays seating information indicating seatings for the participants in a virtual space for each of the conference terminals of the participants. The determining determines a destination of the voice data of the participants for each of the conference terminals of the participants in accordance with the volume information of the voice data, the video data of the participant, and the seating information. The transmitting transmits the voice data of the participants from the conference terminals of the participants in accordance with the destination determined for the voice data of the participants.

A teleconference system according to the present disclosure includes conference terminals and a server. The conference terminals are conference terminals for at least three participants who attend a teleconference. The server is connected to the conference terminals of individual participants via a communication line. The conference terminal includes a storage, a display, a voice data generator, a video data generator, a determiner, and a first transmitter. The storage stores seating information indicating seating for the participants in a virtual space. The display displays the seating information. The voice data generator acquires voice of the participants and generates voice data including volume information from the acquired voice. The video data generator acquires video of the participants during the teleconference and generates video data. The determiner determines a destination of the voice data in accordance with the volume information of the voice data and the video data, as well as the seating information. The first transmitter transmits voice information including the voice data associated with destination information indicating the determined destination and the video data including the video data to the server, along with the source information indicating an own terminal. The server includes an acquirer and a second transmitter. The acquirer acquires the voice information, the video information, and the source information from the individual conference terminals. The second transmitter transmits the voice information to the individual conference terminals in accordance with the destination information of acquired the voice information from the individual conference terminals.

BRIEF DESCRIPTION OF THE DRAWINGS

FIG. 3A illustrates an example of a seating chart;

FIG. 3B illustrates an example of seating information;

FIG. 4 is a block diagram schematically illustrating the structure of a server according to the embodiment;

FIG. 5A is a flowchart illustrating the operation of transmission and reception processing of voice data and video data at the conference terminals and the server.

DETAILED DESCRIPTION

Figure 1:
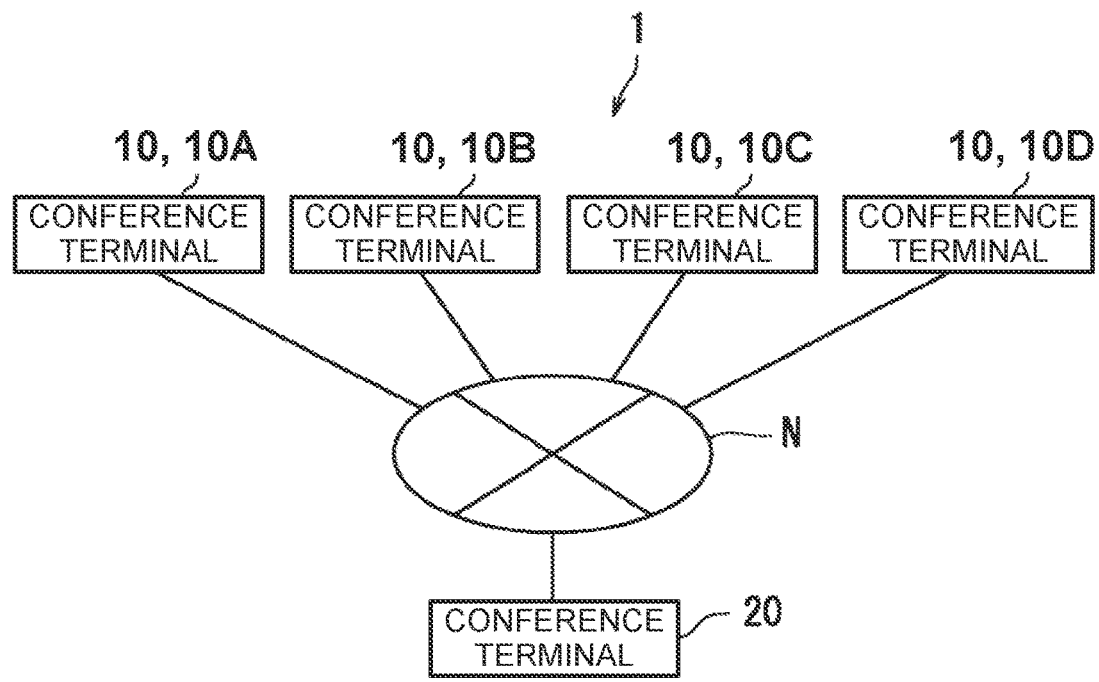
FIG. 1 is a schematic diagram of a videoconference system according to an embodiment.

A teleconference system and a teleconference method according to an embodiment will be described below with reference to the accompanying drawings. In the drawings, the same reference signs are given to the same or similar components, and the description of such components will not be repeated.

FIG. 1 is a schematic diagram illustrating the structure of a videoconference system 1 (example of a teleconference system). As illustrated in FIG. 1, the videoconference system 1 includes conference terminals 10 for a plurality of participants who attend a videoconference and a server 20. In the present embodiment, it is assumed that four participants A to D attend the videoconference. To distinguish between the conference terminals 10 for the participants A to D, the conference terminals are referred to as conference terminals 10A to 10D. The number of participants who attend the videoconference may not be four, and at least three participants should attend.

The conference terminals 10 and the server 20 are connected to a communication line N such as a public line or a leased line. Each participant uses the conference terminal 10 to communicate with other participants located at remote places to conduct the videoconference. Each participant attends the videoconference as if the participant were seated at the seat designated in the seating chart in a predetermined virtual space. In the following, the structure of the videoconference system 1 is described.

Conference Terminals 10 (10A to 10D)

Figure 2:
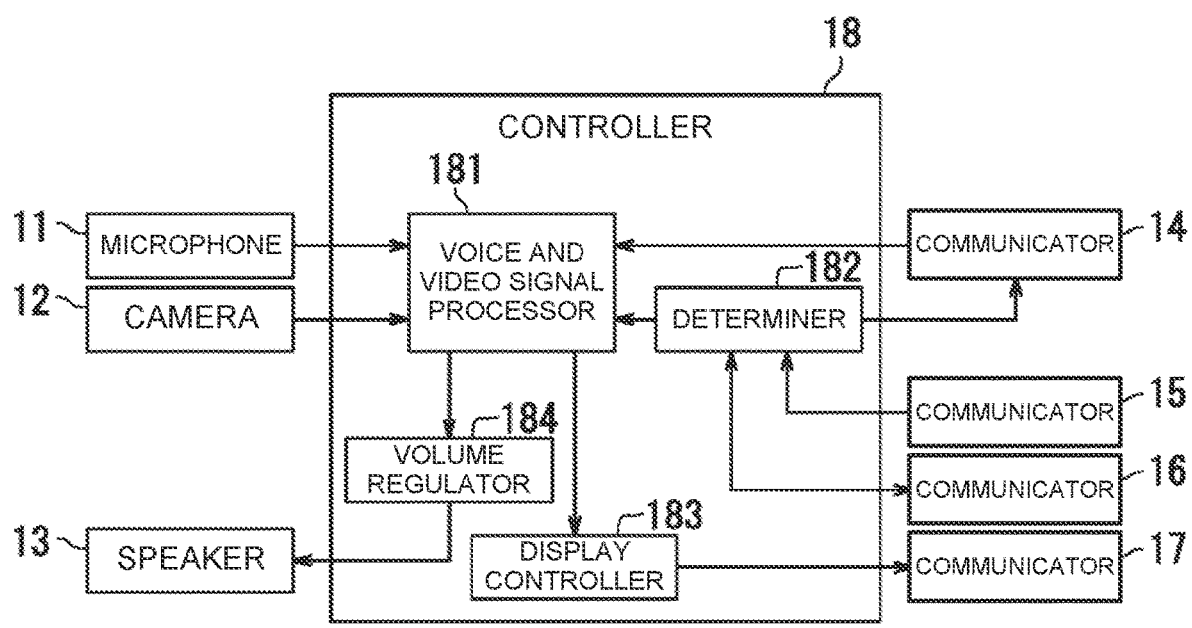
FIG. 2 is a block diagram schematically illustrating a structure of a conference terminal according to the embodiment.

FIG. 2 is a block diagram schematically illustrating the structure of a conference terminal 10. In the present embodiment, the conference terminal 10 may be a device such as a personal computer (PC), a tablet terminal, or a smartphone.

The structure of the conference terminal 10 is described below using the conference terminal 10A of a participant A as an example.

As illustrated in FIG. 2, the conference terminal 10A includes a microphone 11, a camera 12, a speaker 13, a communicator 14 (example of a first transmitter/receiver), an operation acceptor 15 (example of a selection acceptor), a storage 16, a display 17, and a controller 18.

The microphone 11 collects the voice of the participant A and outputs a voice signal of the collected voice to the controller 18.

The camera 12 captures images of the participant A as a subject and outputs a captured image signal to the controller 18.

The speaker 13 performs D/A conversion of the voice signal output from controller 18, and amplifies and outputs the converted voice signal.

The communicator 14 is a communication interface for communicating with the server 20 via the communication line N. The communicator 14 establishes communication with the server 20 under the control of the controller 18 using, for example, a communication protocol such as the Real-time Transport Protocol (RTP) to transmit and receive the video data and the voice data. Specifically, the communicator 14 outputs the video data and the voice data received from the server 20 to the controller 18. The communicator 14 transmits the video data and the voice data entered from the controller 18 to the server 20.

The operation acceptor 15 includes a mouse, keyboard, a touch panel, and the like. The operation acceptor 15 accepts the operation of the participant A and outputs an operation signal indicating the accepted operation to the controller 18.

The storage 16 includes a nonvolatile storage medium such as a hard disk drive. The storage 16 stores a seating chart 100a and seating information 100b. FIG. 3A illustrates an example of the seating chart 100a. The seating chart 100a illustrates the seats for the participants A to D in the virtual space. Specifically, the seating chart 100a consists of a circular virtual table T surrounded by seats S1 to S4 marked with identifying information that identifies the participants (for example, name of the participants). The seats for the participants A to D are the seats marked with alphabetical letters for individual participants A to D. The seating chart 100a is displayed on the display 17 during the videoconference.

FIG. 3B illustrates an example of the seating information 100b. The seating information 100b is the information indicating the positions of the participants A to D in the virtual space, corresponding to the seating chart 100a illustrated in FIG. 3A. As illustrated in FIG. 3B, the seating information 100b stores, for each participant, information of the conference terminals 10 (for example, an IP address) of the participants seated on the left and right of each participant.

The display 17 includes a display panel and a drive circuit that drives the display panel (both of which are not illustrated). Under the control of the controller 18, the drive circuit provides a drive signal enabling the display of various images including the image of the seating chart 100a and the video images of the participants A to D to the display panel.

The controller 18 includes a central processing unit (CPU) and a memory (read only memory (ROM) and random access memory (RAM)). The CPU executes a control program stored in the ROM to allow the controller 18 to function as a voice and video processor 181 (example of the voice data generator and the video data generator), a determiner 182, a display controller 183, and a volume regulator 184.

The voice and video processor 181 includes a CODEC. The voice and video processor 181 sequentially transmits and receives video data packets and voice data packets (examples of video information and voice information) during the videoconference via a communicator 21 to and from the server 20.

Specifically, the voice and video processor 181 converts the voice signals entered at regular intervals from the microphone 11 and the video signals entered at regular intervals from the camera 12, and converts the signals into digital data according to standards for the videoconference system (for example, H.323). The voice and video processor 181 encodes the digital data to generate the voice data and the video data, which are then output to the determiner 182.

The voice and video processor 181 also decodes the video data and the voice data which are sequentially entered from the server 20 via the communicator 14. The video data and the voice data from the server 20 are multiplexed with the video data and the voice data from other conference terminals B to D. The voice and video processor 181 decodes the video data and the voice data from the server 20 and separates them into the video data packets and the voice data packets for each of the conference terminals B to D. The voice data from the conference terminals B to D each include volume information, with information such as destination information, source information, and time stamps added to the voice data. The source information is the IP address of the conference terminal 10 from which the voice data is transmitted. The destination information includes either first destination information or second destination information. The first destination information is the IP addresses of all of the conference terminals 10 other than the own terminal, and the second destination information is the IP address of one of the other conference terminals 10.

Hereinafter, the voice data including the first destination information may be referred to as the first voice data, and the voice data including the second destination information as the second voice data.

The voice and video processor 181 arranges the decoded and separated voice data for each conference terminal 10 in the order of time stamps and outputs the voice data to the volume regulator 184.

The volume regulator 184 adjusts the gain of individual voice data in accordance with the destination information and the volume information included in the voice data for each conference terminal 10, and mixes and outputs the gain-adjusted voice signals from the speaker 13. Specifically, the volume regulator 184 operates in a normal mode when all the voice data from the conference terminals B to D (hereinafter referred to as voice data B to D) are the first voice data. The normal mode is a mode in which the voice signals are mixed and entered to the speaker 13 with the overall voice adjusted to a uniform volume in accordance with the volume information of the individual voice data. On the other hand, the volume regulator 184 operates in a specified mode when any one of the voice data B to D is the second voice data, that is, the voice data including both the first voice data and the second voice data. The specified mode is a mode in which the gain of the voice signals are adjusted, and mixed and entered to the speaker 13 such that the volume of the first voice data is smaller than the volume of the second voice data. In the present embodiment, the voice and video processor 181, the volume regulator 184, and the speaker 13 are examples of the reproducer.

The determiner 182 determines the destination of the voice data in accordance with the video data and the voice data which are entered from the voice and video processor 181, as well as the seating information 100b. Then, the determiner 182 generates and outputs to the communicator 14 the voice data packets to which the header information including the destination information and the like are added indicating the determined destination, and the video data packets to which the header information including the destination information and the like indicating all of the other conference terminals 10 are added.

Specifically, when the voice data of the participant A (hereinafter referred to as voice data A) entered from the voice and video processor 181 exceeds a threshold, the determiner 182 sets first destination information indicating the IP address of all conference terminals 10 other than the conference terminal of the participant A as the destination information of the voice data A.

When the volume of the voice data A does not exceed the threshold, the determiner 182 performs image analysis of the video data entered at roughly the same timing as the voice data A, and sets the second destination information indicating the IP address of a particular conference terminal 10 as the destination information of the voice data A. The particular conference terminal 10 is determined in accordance with the orientation of the face of the participant A in the video data and the seating information 100b. In other words, the determiner 182 determines the particular conference terminal 10B or 10D for the participant B or D located next to the participant A who faces (leftward or rightward) the participant A as the destination. For example, when the participant A turns his/her face toward the participant D to the right (see FIG. 3A) and speaks in a small voice at a volume that does not exceed the threshold, the IP address of the conference terminal 10D is set as the second destination information.

The display controller 183 outputs the video data of the participants A to D entered from the voice and video processor 181 to the display 17 and displays the video of the participants A to D on the display 17. During the videoconference, the display controller 183 causes the seating chart 100a illustrated in FIG. 3A to be displayed on the display 17. The video images of the participants A to D may be displayed in the same arrangement as that of the participants A to D in the seating chart 100a. In the present embodiment, the display controller 183 and the display 17 are examples of the reproducer.

Server 20

FIG. 4 is a block diagram schematically illustrating the structure of the server 20. As illustrated in FIG. 4, the server 20 includes the communicator 21 (example of the acquirer and the second transmitter), a controller 22, and a storage 23.

The communicator 21 is a communication interface that communicates with the conference terminals 10A to 10D via the communication line N. Under the control of the controller 22, the communicator 21 uses a predetermined communication protocol such as the RTP to establish communication with the conference terminals 10A to 10D, and transmits and receives the video data and the voice data.

The storage 23 includes a nonvolatile storage medium such as a hard disk drive. The storage 23 stores the conference terminal information (not illustrated) including the identification information (IP address or the like) of the conference terminals 10A to 10D.

The controller 22 includes the CPU and the storage (the ROM and the RAM). The controller 22 causes the CPU to execute the control program stored in the ROM to communicate with the conference terminals 10 via the communicator 21. Specifically, the controller 22 acquires the voice data (first or second voice data) packets and the video data packets which are transmitted from individual conference terminals 10 and transmits these data packets to the conference terminals 10 other than the source of the voice data packets and video data packets.

In other words, the video data transmitted to the conference terminal 10A is the video data multiplexed with the video data B to D transmitted from the conference terminals 10B to 10D. In addition, when the voice data A to D acquired from the conference terminals 10A to 10D are the first voice data, the voice data multiplexed with the voice data B to D is transmitted to the conference terminal 10A. For example, when the voice data A of the voice data A to D is the second voice data including the second destination information indicating the conference terminal 10D, the voice data multiplexed with the voice data B and C (first voice data) and the voice data A (second voice data) is transmitted to the conference terminal 10D. In this case, the voice data multiplexed with the voice data B to D (first voice data) is transmitted to the conference terminal 10A. The voice data multiplexed with the voice data C and D (first voice data) is transmitted to the conference terminal 10B. The voice data multiplexed with the voice data B and D (first voice data) is transmitted to the conference terminal 10C.

Operation

Figure 5B:
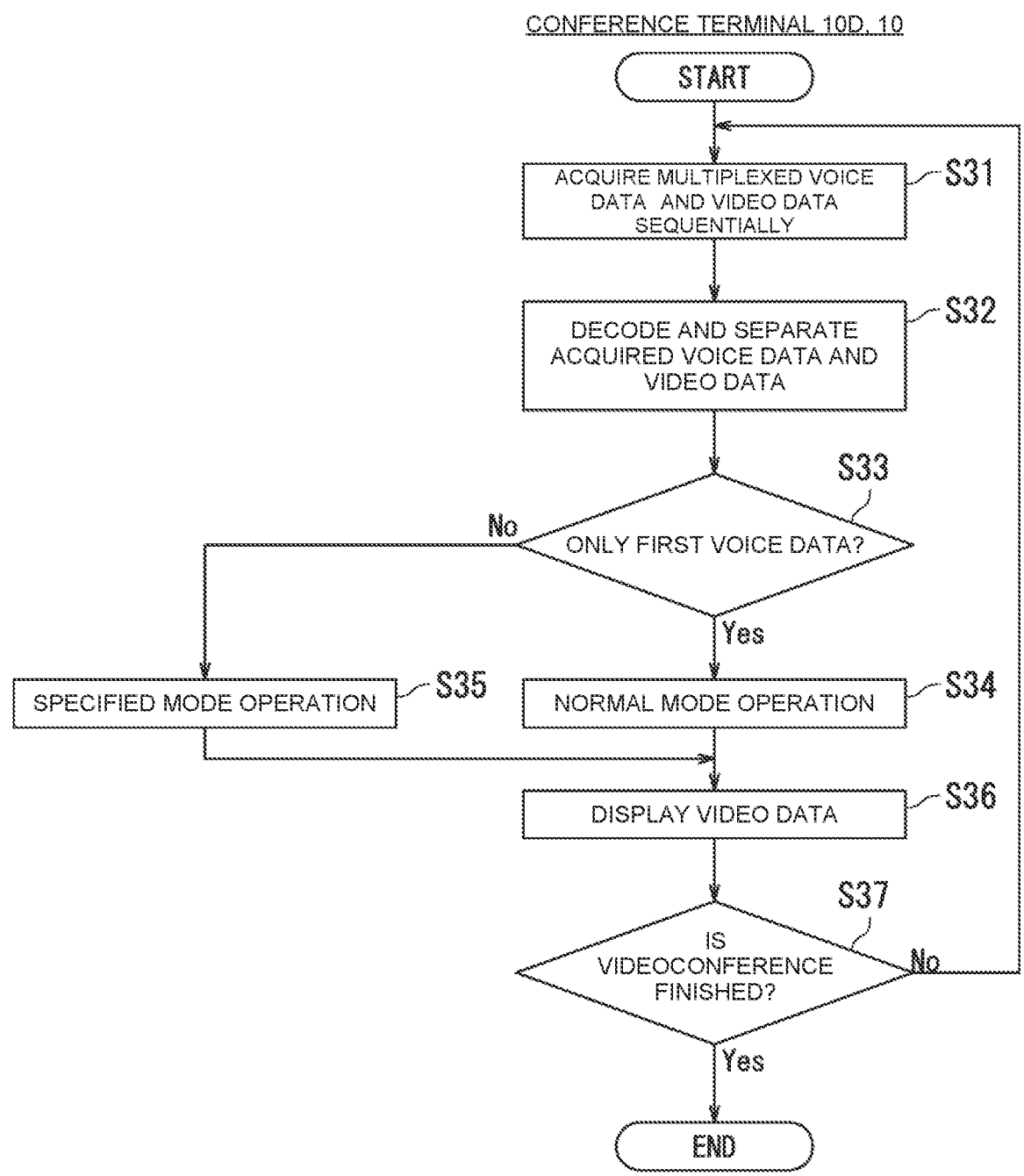
FIG. 5B is a flowchart illustrating the operation of reproduction processing of the video data and the voice data transmitted from the server at the conference terminals.

FIG. 5A is a flowchart illustrating the operation of transmission and reception processing of the voice data and the video data at the conference terminal 10A and the server 20. FIG. 5B is a flowchart illustrating the operation of reproduction processing of the video data and the voice data transmitted form the server 20 at the conference terminal 10D. In FIGS. 5A and 5B, it is assumed that the display 17 of each conference terminal 10 shows the seating chart 100a illustrated in FIG. 3A.

In FIG. 5A, during the videoconference, the conference terminal 10A collects voice from the participant A via the microphone 11, and performs video shooting of the participant A with the camera 12. The controller 18 in the conference terminal 10A encodes the voice signal collected with the microphone 11 and the video signal taken by the camera 12 by A/D conversion in the voice and video processor 181 to sequentially acquire the voice data A and the video data A (step S11).

If the volume of the voice data A is equal to or greater than a threshold (step S12: Yes), the controller 18 causes the determiner 182 to generate the voice data A (first voice data) packets to which the first destination information indicating the conference terminals 10B to 10D and the source information indicating the own terminal, and the like, are added, as well as the video data A packets, and transmit the packets to the server 20 via the communicator 14 (step S13).

If the volume of the voice data A does not exceed the threshold (step S12: No), the controller 18 causes the determiner 182 to generate the second voice data packets and the video data A packets and transmit the packets to the server 20 via the communicator 14 (step S14).

Specifically, the determiner 182 analyzes the images of the acquired video data by referring to the seating information 100b (FIG. 3B) and determines the conference terminal 10 that corresponds to the orientation of the face of the participant A as the destination. Then, the determiner 182 generates the voice data A (second voice data) packets to which the destination information indicating the IP address of the determined conference terminal 10, the source information indicating the own terminal, and the like are added.

The determiner 182 also generates the video data A packets to which the destination information indicating the IP addresses of all other conference terminals 10, the source information indicating the own terminal, and the like are added. The determiner 182 enters the voice data A packets and the video data A packets to the communicator 14. The communicator 14 transmits the voice data A (second voice data) packets and the video data A packets entered from the determiner 182 to the server 20.

That is, for example, when the participant A wants to talk to the participant D during the videoconference, the participant A turns his/her face to the right and speaks in a small voice. In this case, the conference terminal 10D is determined as the destination of the voice data of the participant A (voice data A), and the voice data A (second voice data) packets to which the second destination information indicating the IP address of the conference terminal 10D and the like are added is transmitted to the server 20 with the video data A packets.

The controller 18 repeats the process from step S11 onward until the videoconference is finished (step S15: No), and ends the process when the videoconference is finished (step S15: Yes).

The server 20 sequentially acquires the voice data (voice data A to D) and the video data (video data A to D) from the conference terminals 10A to 10D via the communicator 21 (step S21).

If the acquired voice data A to D includes the second voice data packets (S22: Yes), the controller 22 multiplexes the second voice data packets with the first voice data packets and transmits the multiplexed data to the conference terminal 10 indicated by the second destination information in the second voice data packets, while transmitting the multiplexed first voice data packets to the other conference terminals 10 (step S23).

In other words, if the voice data A packets include the second destination information indicating the IP address of conference terminal 10D, the voice data multiplexed with the voice data A (second voice data) packets and the voice data B to D (first voice data) packets, as well as the video data multiplexed with the video data A to C packets are transmitted to the conference terminal 10D. The conference terminal 10A receives the voice data and the video data each multiplexed with the voice data B to D packets and the video data B to D packets. The conference terminal 10B receives the voice data and the video data each multiplexed with the voice data packets C and D and the video data packets A, C, and D. The conference terminal 10C receives the voice data and the video data each multiplexed with the voice data packets B and D and the video data packets A, B, and D. Thus, to the conference terminals 10 other than the conference terminal 10 determined as the destination of the second voice data, only the first voice data from the conference terminals 10 other than the own terminal 10 are multiplexed and transmitted.

Then, the controller 22 transmits the video data packets acquired from the conference terminals 10 and multiplexed to the conference terminals 10 via the communicator 21 (step S24). In other words, the conference terminal 10A receives the video data multiplexed with the video data packets B to D, and the conference terminal 10B receives the video data multiplexed with the video data packets A, C, and D. The conference terminal 10C receives the video data multiplexed with the video data packets A, B, and D, and the conference terminal 10D receives the video data multiplexed with the video data packets A to C.

If none of the acquired voice data A to D packets include the second voice data packets (step S22: No), that is, when only the first voice data packets are acquired, the controller 22 transmits, to each conference terminal 10, the voice data multiplexed with the voice data packets acquired from other conference terminals 10 to the individual conference terminals via the communicator 21 (step S25). Specifically, the voice data multiplexed with the voice data B to D packets is transmitted to the conference terminal 10A, and the voice data multiplexed with the voice data A, C, and D packets is transmitted to the conference terminal 10B. To the conference terminal 10C, the voice data multiplexed with the packets of the voice data A, B, and D is transmitted, while the voice data multiplexed with the packets of the voice data A to C is transmitted to the conference terminal 10D.

The controller 22 repeats the process from step S21 onward until the videoconference is finished (step S26: No), and ends the process when the videoconference is finished (step S26: Yes).

In FIG. 5A, the conference terminal 10A is used as an example for the illustrative purpose, but the conference terminals 10B to 10D may be processed similarly to the conference terminal 10A according to the speech of the participants B to D.

Next, referring to FIG. 5B, reproduction processing of the voice and video at the conference terminal 10D is described. The conference terminal 10D acquires the multiplexed voice data and the video data sequentially from the server 20 via the communicator 14 (step S31).

The controller 18 of the conference terminal 10D causes the voice and video processor 181 to decode the acquired voice data and video data and separate the voice data A to C packets and the video data A to C packets (step S32).

If the voice data A to C packets only include the first voice data packets (step S33: Yes), the controller 18 causes the volume regulator 184 to operate in the normal mode (step S33). Specifically, the volume regulator 184 adjusts the gain of the voice data, mixes the gain-adjusted voice signals such that the volume of the voice data A to C is uniform, and outputs the mixed voice signals from the speaker 13.

In step S33, if the voice data A to C packets include the second voice data packets (step S33: No), the controller 18 causes the volume regulator 184 to operate in the specified mode (Step S35). The voice data A is the second voice data with the conference terminal D designated as the destination. The volume regulator 184 adjusts the gain of the voice data A to C, mixes the gain-adjusted voice signals such that the volume of the voice data B and C is smaller than the volume of the voice data A, and enters the mixed voice signal to the speaker 13. The speaker 13 amplifies and outputs the voice signals from the volume regulator 184. This allows participant D to easily hear the voice of the participant A while hearing the voices of the participants B and C in addition to the voice of the participant A.

Then, the controller 18 causes the voice and video processor 181 to output the video data A to C to the display controller 183 and display the video of the participants A to C on the display 17 (step S36).

The controller 18 repeats the process from step S31 onward until the videoconference is finished (step S37: No), and ends the reproduction processing when the videoconference is finished (step S37: Yes).

In FIG. 5B, the conference terminal 10D is used as the example for the illustrative purpose, but the conference terminals 10A to 10C may also perform the same processing as the conference terminal 10D according to the voice data acquired from the server 20.

In the present embodiment, each participant can transmit his/her voice to the specific participant by talking to a neighboring participant in a small voice in the virtual space during the videoconference, thus allowing the voice of the participant only to the specific participant. Accordingly, the conference participants can talk to each other without interrupting the progress of the videoconference. This facilitates hearing the conversations between some participants, as the voice of the conversations between some participants is reproduced smaller than the voice of other participants. Since some participants can talk to each other while listening to the voices of the videoconference, the participants can feel as if they actually attend a face-to-face meeting, compared to the case where they cannot hear the voice at all during the videoconference.

The embodiment of the teleconference system and the teleconference method according to the present disclosure have been described heretofore. The teleconference system and the teleconference method are not limited to the above embodiment, and can be implemented in various ways without departing from the gist thereof. The drawings mainly illustrate the constituent components schematically for easier understanding, and those illustrated in the drawings are different from actual ones in terms of thickness, length, number, and the like. The shapes, dimensions, and the like of individual constituent components illustrated in the above embodiment are merely examples and are not particularly limited, and various changes can be made without substantially departing from the effect of the present disclosure. Modifications of the above embodiment are described below.

Modification (1) When reproducing the second voice data at the conference terminals 10, the display mode to display the participants on the display 17 may be changed to allow the source of the second voice data to be recognized. Specifically, for example, the image of the participant corresponding to the source of the second voice data may be displayed larger than the images of other participants, or the image of the participant corresponding to the source of the second voice data may be superimposed with a mark indicating that the second voice data is being reproduced.

(2) When the volume of the voice data does not exceed the threshold, the determiner 182 may determine the destination of the voice data in accordance with the operation of the participant at the operation acceptor 15, as well as the orientation of the face of the participant seen in the video data. The participant may operate to designate one of the seats S1 to S4 in the seating chart 100a displayed on the display 17 with a mouse or the like. Thus, it is possible to determine the destination of the voice data more reliably and flexibly.

(3) The voice data transmitted from the server 20 to the conference terminals 10 may include the second voice data transmitted from the plurality of different conference terminals 10. For example, when the participant A and the participant C talk to the participant D in a small voice, the server 20 may transmit the voice data multiplexed with the voice data (second voice data) A and C packets and the voice data (first voice data) B packets to the conference terminal 10D. In response, the volume regulator 184 of the conference terminal 10D adjusts the gain to reduce the volume of the voice data B to be smaller than the volume of the voice data A and C, mixes the gain-adjusted voice signals of the voice data A to C, and outputs the mixed voice signals from the speaker 13. It is also possible to reduce the volume of one of the voice data A and the voice data C to be smaller than the other according to a predetermined priority.

(4) The server 20 may regulate the volume of the conference terminals 10 and multiplex the volume-regulated voice data before transmitting the voice data to the individual conference terminals 10.

(5) The videoconference system 1 may be applied to a web conference system (example of the teleconference system) in which the conference terminals 10 and the server 20 are connected via the Internet. In this case, each conference terminal 10 establishes the RTP session with other conference terminals 10 that participate in the videoconference, and transmits RTP packets that includes the video data and the voice data having been encoded and processed with a predetermined encryption process to the server 20. Each conference terminal 10 decodes and separates the multiplexed voice data and video data from the server 20, and decodes and reproduces the voice data and video data.

(6) In a case where silence voice data packets are generated at the conference terminal 10 during the generation of the voice data packet, silence information indicating that the voice data is silent may be added to the voice data. In this case, for example, after receiving the voice data including the second voice data of the conference terminal 10A from the server 20 in step S33, the conference terminal 10D may operate in the specified mode until a predetermined number of packets of the second voice data with the silence information added thereto are received successively. The conference terminal 10A exits the specified mode when the predetermined number of packets of the second voice data with the silence information added thereto have been received successively.

(7) When the participant of the conference operates the conference terminal 10 to perform, for example, a video-off operation to not transmit the video to the server 20, the conference terminal 10 may transmit, to the server 20, a predetermined image signal that includes the identification information indicating the relevant participant or conference terminal 10, or a video-off signal indicating the video-off. The server 20 may transmit the predetermined image signal or video-off signal received from the particular conference terminal 10 to other conference terminals 10 and display an image according to the predetermined image signal or video-off signal at other conference terminals 10.

What is claimed is:

1. A teleconference method, comprising:
   a first generating comprising acquiring voices of at least three participants who attend a teleconference and generating voice data including volume information from the acquired voices for each conference terminal of each participant;
   a second generating comprising acquiring video of the participants during the teleconference and generating video data for each conference terminal of each participant;
   displaying seating information indicating seatings associated with the participants in a virtual space at the conference terminals of the participants;
   determining, for each conference terminal of each participant, a destination of the voice data of the participant in accordance with the volume information of the voice data, the video data of the participant, and the seating information associated with the participant; and
   transmitting, for each conference terminal of each participant, the voice data of the participant in accordance with the destination determined for the voice data of the participant.

2. The teleconference method according to claim 1, wherein
the transmitting includes, in accordance with a source of the voice data of each participant, transmitting the video data from the conference terminals of participants other than the participant, to a conference terminal of the participant.

3. The teleconference method according to claim 2, wherein
the determining includes setting, as the destination of the voice data, a first destination indicating the conference terminals of all of the participants or a second destination indicating a conference terminal of a particular participant among all of the participants,
the first destination is set when the volume information of the voice data exceeds a predetermined threshold,
the second destination is set when the volume information of the voice data is equal to or smaller than the predetermined threshold, and
the conference terminal of the particular participant corresponds to an orientation of a face of the particular participant shown in the video data acquired with the voice data and the seating information associated with the particular participant.

4. The teleconference method according to claim 3, further comprising:
reproducing the voice data, for each conference terminal of each participant, comprising receiving the voice data of the other participants and reproducing the received voice data, wherein
when the voice data received comprises the voice data including the first destination and the voice data including the second destination, the reproducing further comprises reproducing the voice data including the first destination at a volume greater than a volume of the voice data including the second destination.

5. The teleconference method according to claim 4, wherein
the reproducing further comprises receiving video data from other conference terminals, among the conference terminals, which are of the other participants, and
the displaying further comprises displaying, in accordance with the seating information associated with the other participants, the video data generated in the second generating, and the video data received in the reproducing from the other conference terminals.

6. The teleconference method according to claim 5, wherein
the reproducing further comprises receiving voice data from the other conference terminals and source information indicating a source of the voice data, and
when the voice data received further comprises the second destination, the displaying further displays the video data corresponding to the source information of the voice data including the second destination and other video data in a distinguishable manner.

7. The teleconference method according to claim 1, further comprising:
accepting a selection of the participants in the seating information displayed in the displaying for each conference terminal of each participants, wherein
the determining determines the destination of the voice data in accordance with the video data and the selection by the participants, the destination of the voice data is accepted in the accepting of the selection.

8. A teleconference system, comprising:
conference terminals for at least three participants who attend a teleconference; and
a server connected to the conference terminals of participants via a communication line;
wherein
the conference terminals each include
a storage that stores seating information indicating seatings associated with the participants in a virtual space,
a display that displays the seating information,
a voice data generator that acquires voices of the participants and generates voice data including volume information from the acquired voices,
a video data generator that acquires video of the participants during the teleconference and generates video data,
a determiner that determines a destination of the voice data in accordance with the volume information of the voice data, the video data, and the seating information, and
a first transmitter that transmits voice information and video information to the server along with source information indication a terminal, the voice information including the voice data that is associated with destination information indicating the determined destination, and the video information including the video data, and
the server includes
an acquirer that acquires the voice information, the video information, and the source information from each conference terminal, and
a second transmitter that transmits, for each conference terminal, the voice information for the conference terminal in accordance with an acquired destination information of the voice information from the conference terminal.

* * * * *